United States Patent [19]
Fischer et al.

[11] Patent Number: 4,887,788
[45] Date of Patent: Dec. 19, 1989

[54] BASE ISOLATION PAD

[75] Inventors: Richard J. Fischer, Golden; Douglas J. Swanson, Castle Rock, both of Colo.

[73] Assignee: The Gates Rubber Company, Denver, Colo.

[21] Appl. No.: 144,844

[22] Filed: Jan. 15, 1988

[51] Int. Cl.⁴ .............................................. F16F 5/00
[52] U.S. Cl. ........................................ 248/562; 248/632; 248/636; 248/638; 52/167 R; 267/140.1
[58] Field of Search ............... 248/632, 562, 634, 638, 248/636, 619–621, 633; 52/167, 785; 267/140.1–140.5

[56] References Cited

U.S. PATENT DOCUMENTS

| | | | |
|---|---|---|---|
| 2,239,319 | 4/1941 | Halford et al. | 248/634 |
| 2,535,080 | 12/1950 | Lee | 267/140.1 |
| 2,557,610 | 6/1951 | Meyers et al. | 267/140.4 |
| 3,223,400 | 12/1965 | Diester, Jr. | 267/1 |
| 3,604,675 | 9/1971 | Mitchell | 248/632 |
| 3,897,856 | 8/1975 | Pineau | 267/140.3 X |
| 4,117,637 | 10/1978 | Robinson | 52/167 |
| 4,154,206 | 5/1979 | Le Salver et al. | 123/192 R |
| 4,216,505 | 8/1980 | Grant et al. | 248/636 |
| 4,401,298 | 8/1983 | Eaton et al. | 267/140.1 |
| 4,499,694 | 2/1985 | Buckle et al. | 52/167 |
| 4,554,767 | 11/1985 | Ikonomou | 52/167 |
| 4,593,502 | 6/1986 | Buckle | 52/167 |
| 4,633,628 | 1/1987 | Mostaghel | 52/167 |
| 4,761,925 | 8/1988 | Fukahori et al. | 248/621 X |
| 4,790,520 | 12/1988 | Tanaka et al. | 248/636 X |

FOREIGN PATENT DOCUMENTS

| | | | |
|---|---|---|---|
| 0206183 | 12/1986 | European Pat. Off. | 52/167 |
| 0219567 | 4/1987 | European Pat. Off. | 52/167 |
| 2122018 | 8/1972 | France | |
| 2429503 | 2/1980 | France | 248/621 |
| 398657 | 9/1933 | United Kingdom | 248/632 |

Primary Examiner—Alvin C. Chin-Shue
Attorney, Agent, or Firm—C. H. Castleman, Jr.; H. W. Oberg, Jr.

[57] ABSTRACT

A device for absorbing the energy of vibration of one of two abutting members which has begun to vibrate due to forces applied to either of the two abutting members, so as to reduce the frequency and magnitude of vibration of one of the two abutting members. The primary energy absorbing element is a piece of elastomeric resilient material which contains a core (or cores) of a substantially incompressible, highly efficient dampening material; the presence or absence of this core of highly efficient dampening material will depend upon desired device stiffness and dampening characteristics. The primary energy absorbing element is surrounded by a flexible reinforced shell which contains and restrains said element, yet allows said element to deform in the transverse and vertical directions. Two end pieces or mounting plates are secured to opposite ends of the primary energy absorbing element.

15 Claims, 5 Drawing Sheets

BASE ISOLATION PAD

FIELD OF THE INVENTION

In general, this invention relates to a device interposed between two abutting members which may vibrate or oscillate relative to one another such as a structure and its foundation pad, or a large piece of machinery and its support base, and capable of effectively absorbing energy applied to either one or both members. In particular, this invention relates to an energy absorbing device capable of isolating structures or large machinery from wind or ground vibrations, so that the structure or piece of machinery is protected from destructive vibrational energy.

BACKGROUND OF THE INVENTION

Structures such as buildings and bridges, as well as large machinery temporarily fixed to the ground, often vibrate due to either the wind or ground vibrations caused by seismic activity, passing vehicles and trains; vibration of a structure can lead to destruction of that structure. Structures which have been isolated or decoupled from the ground by positioning resilient energy absorbing pads between the structure's support members and the ground are unlikely to be destroyed from damaging winds or ground vibrations. There exists prior art which addresses the issue of protecting or isolating super-structures from wind or ground vibrations. These devices are designed to absorb a substantial amount of the vibrational energy, produced by the wind or ground motion, which has been transmitted to a superstructure. Actual, nonlaboratory use of prior art "seismic isolation" devices indicate they will successfully protect superstructures from wind or ground vibration damage by reducing the total force transmitted to a superstructure and minimizing the response (i.e., the magnitude and frequency of oscillation) of upper level stories. However, due to the horizontal stiffness and dampening characteristics of these prior art devices, they are limited to use under large, heavy superstructures.

Three mechanisms employed by known seismic isolation devices to absorb energy are: (1) friction dampening of a stack of abutting metal or metal alloy plates as disclosed in U.S. Pat. No. 4,633,628 issued to Naser Mostaghel; (2) shear energy absorption through the cyclic deformation, crystallization, recovery and grain growth of lead, combined with utilizing the dampening characteristics of stacked thin layers of cured rubber separated by layers of a stiffener material as disclosed in U.S. Pat. No. 4,593,502 issued to Ian G. Buckle; and (3) minimal shear and viscous dampening by way of a simple, thick, solid cured rubber support. When used as the vibrational energy absorbing means of a seismic isolation device, lead absorbs energy while undergoing a phase change caused by cyclical deformation of the lead, whereas cured rubber absorbs energy through shear and viscous dampening without changing phase.

Seismic activity typically produces ground vibration which has a large horizontal component and a small vertical component; therefore, a seismic isolation device must be designed with both horizontal stiffness and dampening characteristics and vertical stiffness and dampening charactristics that enable the device to absorb large horizontal cyclical deflections and small vertical cyclical deflections as well as support the static load of a structure or machine. Although the Buckle device as disclosed protects superstructures by sufficiently dampening the horizontal and vertical components of vibrations resulting from seismic activity, its horizontal stiffness is such that small structures, for example single family dwellings or small bridges, or large machinery temporarily fixed to either the ground or some member which may vibrate, cannot be adequately protected. Other known devices used to protect structures from seismic activity, such as a solid homogenous cured rubber support, has been shown to be ineffective in protecting the structures from destruction when placed under a structure to absorb ground vibrations; this is due to the viscoelastic, resilient and minimal dampening properties of such known solid cured rubber supports as designed.

It is a primary object of this invention to provide an energy absorbing isolation pad with an elastomeric resilient energy absorbing mechanism which gives greater elasticity in the horizontal direction yet maximizes the absorption of the vibrational energy so as to protect small structures or large machinery (as well as superstructures) from destruction.

It is another object to produce such an energy absorbing isolation pad by proper design of an elastomeric resilient energy absorbing mechanism and a reinforced resilient restraining shell, to adequately support a static load such as that produced by a small structure or large machinery (as well as superstructures), yet allow said isolation pad to cyclically deform and/or vibrate in the vertical and transverse/horizontal directions when forces are applied to the isolation pad.

It is yet another object to produce such an energy absorbing isolation pad by proper design of an elastomeric resilient energy absorbing mechanism to allow for ease of said isolation pad customization for loads with different structural characteristics.

It is a further object to produce such an energy absorbing isolation pad by proper simplified design to minimize cost of production.

SUMMARY OF THE INVENTION

Briefly described in one aspect the invention is a shear and viscous vibrational energy absorber comprising a primary energy absorbing element; two end pieces or mounting plates secured to opposite ends of said primary energy absorbing element, each end piece can be engaged to one of two members that abut one another until a base isolation pad is interposed between them; and a flexible reinforced restraining shell surrounding the primary energy absorbing element in the region between the two secured end pieces, said shell and the two secured end pieces functioning together as a container for the primary energy absorbing element to restrain yet allow said energy absorbing element to vibrate and deform in the transverse and vertical directions, and said shell and said primary energy absorbing element functioning together as a support for the components of static force which result from compressing the energy absorber. The primary energy absorbing element is designed to absorb enough vibrational energy, through shear and viscous dampening, to ensure that a protected structure or machine will not oscillate at a magnitude and frequency which will cause structural damage.

Preferably, the primary energy absorbing element is cylindrical and comprises at least two separate sections of two different materials: one material is a resilient elastomer which minimally dampens and the other is a substantially incompressible material which is a highly effective dampener. Preferably, the primary energy absorbing element has an inner section made of said substantially incompressible, highly efficient dampening material and an outer section made of said resilient elastomer completely surrounding the inner section. Each of the secured end pieces is preferably a circular plate with a substantially flat outer surface and a thickness which is greater in the plate center than it is around the outer perimeter of said plate so that the surface of each plate which is secured to the primary energy absorbing element tapers along a line from the center of the plate to the outer perimeter. The surfaces of each secured end piece, which do not directly contact the primary energy absorbing element or the flexible reinforced restraining shell, are preferably coated with a thin "sacrifical" layer of an environmental resistant elastomer. The flexible reinforced restraining shell is preferably shaped like a tube and comprises a central tensile load carrying section sandwiched between two flexible resilient sections made of similar or different materials, where the central tensile load carrying section substantially extends the full height of said tube-shaped shell. A preferable shell has a central tensile load carrying section that comprises a cord, cable, or single strand helix or that comprises a stack of parallel rings; and said preferable shell has flexible resilient sections made of an elastomer which exhibits resistance to harsh environmental conditions.

In use under a structure or large machine where the axis of the device is positioned vertically, the cylindrical energy absorber device is in vertical compression resulting from the downward force exerted by the weight of a structure or machine. Due to hydrostatic properties of both the resilient elastomer and the substantially incompressible dampening material, the primary energy absorbing element as contained by the flexible reinforced restraining shell operates to support the structure or machine yet allows the device to deform a desired amount. When either secured end piece is subjected to vibrations, the elasticity and dampening of the primary energy absorbing element, as well as the elasticity and tensile strength of the flexible reinforced restraining shell, allow the device to vibrate in both the transverse and vertical directions, absorb most of the energy resulting from subjecting either end plate to vibrations, and return the device to its original static configuration after being deformed.

BRIEF DESCRIPTION OF THE DRAWINGS

The invention in its preferred embodiments will be described in conjunction with the attached drawings, in which like numerals designate like parts, and in which.

PREFERRED EMBODIMENTS OF THE INVENTION

A seismic isolation pad for use between the support member of a structure, such as a bridge or building, and its foundation or base will be particularly described. However, it will be appreciated that the invention may be used between a machine or other structure subject to vibrational loading and its foundation or support so that the axis of the cylindrical energy absorber may be in the vertical direction, the horizontal (transverse) direction or some other direction.

Figure 1:
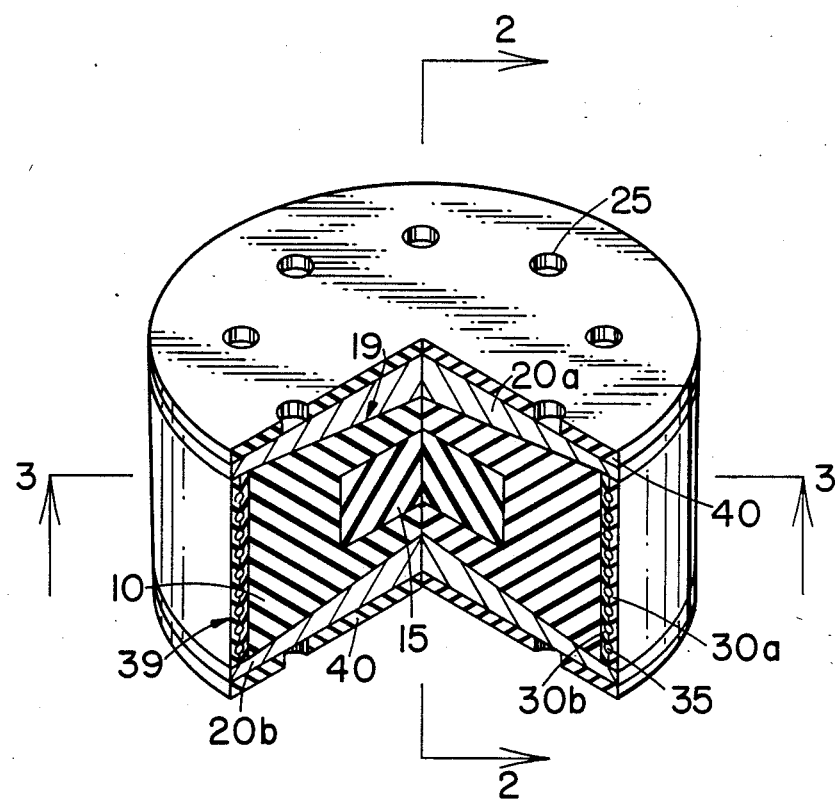
FIG. 1 is a perspective, partially cut away view of a preferred base isolation pad.

Referring to FIG. 1, a preferred embodiment of the invention has a cylindrical primary energy absorbing element 19 comprising an inner, section 15 made of a substantially incompressible or viscous material which is an effective dampener such as natural rubber without curatives added, synthetic rubber without curatives added or blends thereof, high viscosity grease or hydraulic fluid, and a section 10 made of a resilient elastomer which is compatible with the material chosen for the inner section 15. Examples of the resilient elastomer used for section 10 are cured natural rubber, butadiene styrene (SBR), neoprene, Hypalon (a registered trademark of the E. I. du Pont de Nemours Company), ethylene-propylene terpolymer (EPDM), isobutylene isoprene (Butyl), polyurethane or some other similar material with resilient elastic properties. The preferred embodiment seen in FIG. 1 also comprises two end circular plates 20a, 20b each with one substantially flat surface and a thickness which is greater in the plate center than it is near the outer perimeter so that, as FIG. 2 indicates, a sectional view taken through the midpoint of each plate reveals that the conical plate and primary energy absorbing element interface is in the shape of a "V".

A thin "sacrifical" layer 40 of an environmentally resistant resilient elastomer such as neoprene, du Pont's Hypalon, EPDM or polyurethane is preferably placed over the flat side of each plate and secured by way of a chemical bonding mechanism. Each plate has a plurality of apertures 25 spaced generally equidistant from each other and located approximately the same distance from the midpoint of the plate; the apertures can be used for engaging each plate to one of two members that abut one another until a base isolation pad is interposed between them, such as a support member of a structure and its foundation pad or a machine and its support surface. The end plates 20a, 20b are preferably manufactured out of steel or some other metal composite, aluminum or any other suitable metal, or glass.

In addition to the primary energy absorbing element 19 and two end plates 20a, 20b the preferred embodiment of FIG. 1 comprises a flexible reinforced restraining shell 39 surrounding the primary energy absorbing element 19 in the region between the two secured end plates 20a, 20b. The flexible reinforced restraining shell 39 shown in FIG. 1 is tube-shaped and extends at least partially along the height of the cylindrical primary energy absorbing element 39; said shell comprises a central tensile load carrying section 35 sandwiched between and imbedded within two flexible resilient sections 30a, 30b made of similar or different materials, where the central tensile load carrying section 35 extends substantially the full height of said tube-shaped shell. The central tensile load carrying section 35 is preferably a cord, cable or single strand helix made of either fiber bundles or a textile composed of cotton, rayon, nylon, polyester or an aramid continuous filament yarn such as Kevlar (a registered trademark of E. I. du Pont de Nemours Company), or said cord, cable or single strand helix can be made of a metal or metal alloy. Thus, preferably the central tensile load carrying section is made of a material having a modulus of elasticity of approximately 100,000 $lb/in^2$ or greater. Preferably the cord, cable, or single strand helix is wound at an angle that is between 54° to 90° from the vertical direction, the vertical direction being defined to be parallel with the vertical center axis of the helix. The central tensile load carrying section 35 can also comprise a stack of parallel rings, made of a textile, metal, or metal alloy, that has a vertical central axis. Each ring of the stack of rings can be separated by a layer of an elastomeric material to prevent wear of the rings. The flexible resilient sections 30a, 30b are preferably made of the same material and may be made from neoprene, du Pont's Hypalon, ethylene-propylene diene terpolymer (EPDM), isobutylene isoprene (Butyl), polyurethane or some other elastomer system which exhibits resistance to harsh environmental conditions.

Prefabricated aluminum end plates 20a, 20b which have been covered with a thin layer 40 of elastomer, are preferably secured to each end of said energy absorbing element by way of a chemical bonding mechanism. If the end plates 20a, 20b are made of glass, such chemical bonding mechanism can be phenolic resin or epoxy. The "V" shape of the interface between the plate and energy absorbing element provides a mechanical bond to lower the shear stresses which the chemical bond must withstand during periods of device vibration. The total bonding system, preferably, although not necessarily, consisting of both a chemical and mechanical bonding mechanism, ensures that the end plates will stay securely attached to the energy absorbing element.

Figure 2:
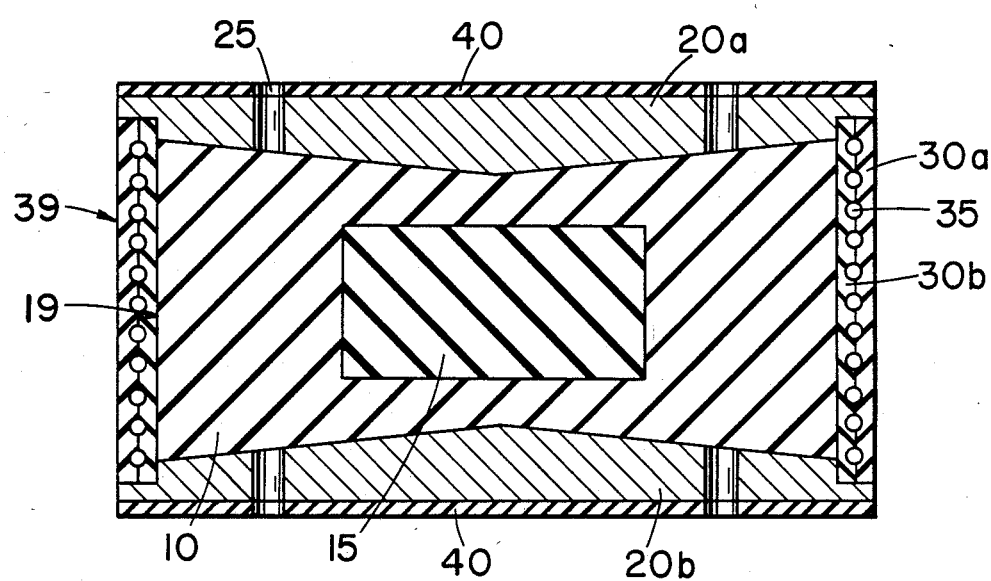
FIG. 2 is a sectional view taken along line 2—2 of FIG. 1.
Figure 3:
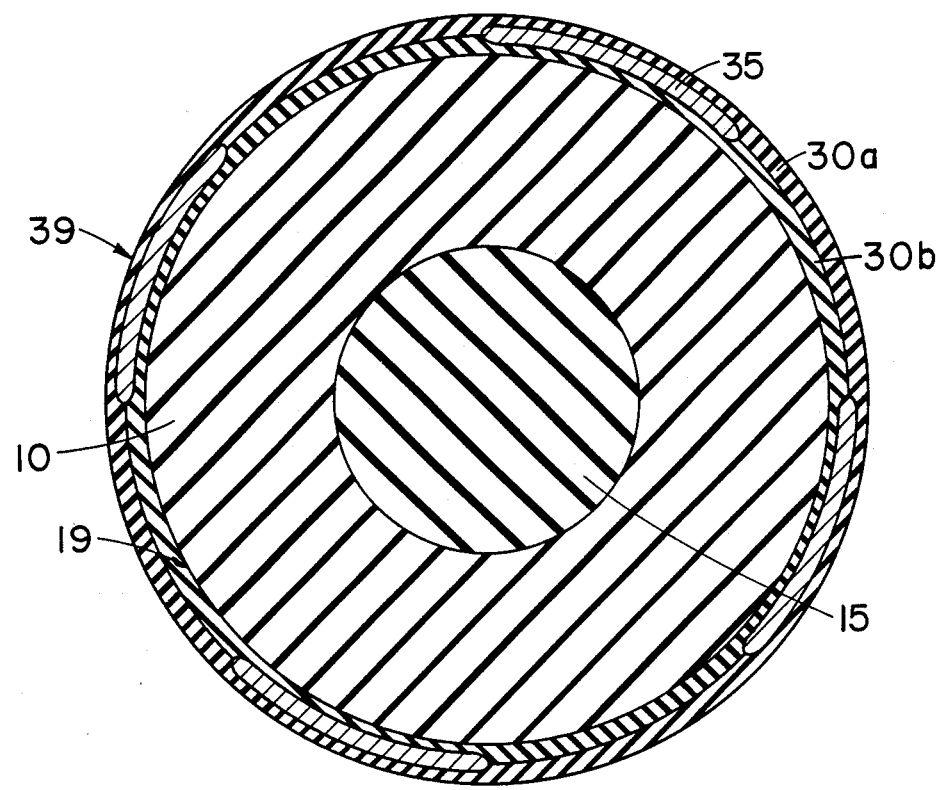
FIG. 3 is a top sectional view taken along 3—3 of FIG. 1, showing a central circular core of substantially incompressible dampening material.
Figure 4:
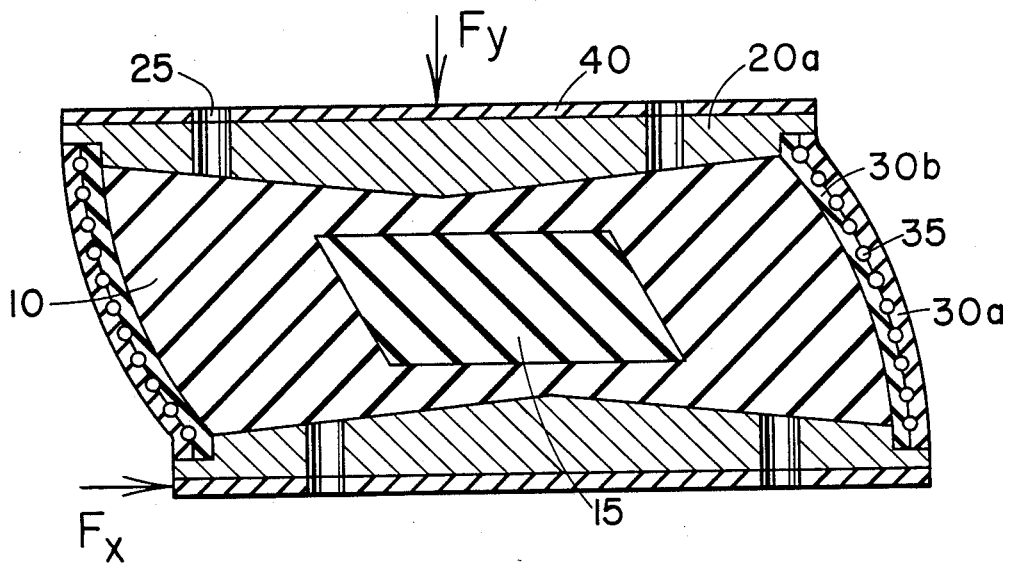
FIG. 4 is a sectional view similar to FIG. 2 illustrating the preferred device under a static vertical force $F_Y$ and a transverse force $F_X$.

The preferred embodiment pictured in FIGS. 1, 2 and 4 is preferably produced as follows. A cylindrical primary energy absorbing element 19 is built but left uncured. The reinforced shell 39 pictured in FIGS. 1, 2 and 4 is preferably mandrel built and cured using known methods of manufacture for either reinforced hose or industrial belt sleeves which have not yet been cut; said shell is built so that its inner diameter is slightly larger than the outer diameter of the primary energy absorbing element to allow the energy absorbing element to be positioned inside said shell with ease. Preferably, the reinforced shell is cured before being placed around the energy absorbing element. Once said energy absorbing element is positioned inside said shell, each end plate 20a, 20b which has been covered with the thin protective layer 40 is positioned above and below the primary energy absorbing element so that the flat surface is facing outward. The device as assembled is then vulcanized or cured in the shape of a cylinder using known vulcanizing or curing techniques. Since the inner section 15 of the preferable primary energy absorbing element 19 may be made with natural rubber without curatives added, synthetic rubber without curatives added or blends thereof, high viscosity grease or hydraulic fluid, this inner section 15 will not be cured by the vulcanization of the assembled device.

In an alternative fabrication of the device, the uncured primary energy absorbing element 19 is positioned inside a reinforced shell which has been mandrel built but not yet cured. Each end plate 20a, 20b which has already been covered with the thin protective resilient layer 40, is then positioned above and below the primary energy absorbing element. The entire device is cured in the shape of a cylinder using known vulcanizing or curing techniques. Again, the inner section 15 of the primary energy absorbing element 19 will remain uncured.

In operation, the device can be installed between a support member of a structure such as a bridge or building, and a base such as a foundation pad, or the device can be installed between a piece of large machinery and its base or foundation. An installed device will be subject to a vertical compression force; and if either the support member, piece of machinery, base or foundation pad begins to vibrate, cyclical deformation of the device will occur as shown in FIG. 4.

The primary energy absorbing element 19 as contained by the flexible reinforced restraining shell 39 operates to support the structure or machine which is to be isolated and protected. The flexible reinforced restraining shell 39 functions in conjunction with the two end plates 20a, 20b to define a container which restrains the primary energy absorbing element yet allows the device to vibrate and deform. Due to the hydrostatic properties of the materials preferably chosen for both the outer section 10 and inner section 15 of the primary energy absorbing element, the amount of vertical deflection of a device under the static compression forces of a structure or machine, as well as the magnitude of vibrational vertical and horizontal deflection of the device, are substantially dependent upon physical characteristics of the tensile load carrying section 35 which restrains said energy absorbing element. The device can be built to support vertical components of static force, such as the force $F_y$ shown in FIG. 4, without substantial displacement and deformation in the vertical direction.

The amplitude of vibration of structures or large machinery due to vibrations caused by either the wind or ground vibration, is typically much larger in the horizontal direction than it is in the vertical direction. In order to prevent the oscillation of a small structure, such as a family dwelling, or a large piece of machinery from attaining a magnitude and frequency which will cause destruction, this device as designed maintains a relatively high vertical stiffness yet low horizontal stiffness. Maintaining low vertical stiffness is desirable when protecting small structures, as opposed to superstructures, due to the physical and mathematical relationships between the frequency of oscillation of the structure, the horizontal stiffness of the device, and the vertical load being supported by the device. Although some shear dampening of incoming vibrational energy takes place in the resilient elastomeric outer section 10 and in the flexible resilient sections 30a, 30b of the reinforced shell, a large part of the dampening is attributable to viscous dampening in the inner section 15 of the primary energy absorbing element 19.

Computer simulated earthquake results using displacement data taken from the 1940 El Centro, Calif. earthquake, were generated. The simulation was done for a sample structure having a mass equal to a typical 1600 square foot 2-story residence on a cement slab. To generate its results, the computer used a measured spring rate and damping coefficient for a system of 16 pads equally spaced under the sample structure on 8 ft. centers. Each pad was produced by one of the herein described methods and was configured like one of the herein described embodiments. Structures can be built to withstand a transverse acceleration, with respect to ground, of 0.3 times the acceleration due to gravity (hereafter referred to as 0.3 g). The computer simulated results for the aforementioned system of pads, indicated that the sample structure only reached a maximum transverse acceleration of 0.18 g during an earthquake which accelerated the ground to slightly over 0.3 g, (which was the maximum acceleration of the 1940 earthquake). In addition, the computer results indicated that the structure's displacement or deflection from its pre-earthquake position, closely followed the ground deflection from its pre-earthquake position, as desired.

Actual biaxial tests conducted on base isolation pads fabricated according to the teachings of the instant invention have shown generally that: (1) the spring rate, vertical load capacity, and damping rate of the pads change as expected for different pad configurations, loads applied, and frequencies of vibration; (2) the pads tested were capable of handling severe deformations at a rapid rate for many cycles; and (3) if there is no bond between the restraining shell and the primary energy absorbing element, the shell can move independently of the energy absorbing element thus placing less stress on the shell (note that while this result does not affect the effectiveness of the base isolation pad, the pad's vertical response properties can be affected by the state of bond between the shell and the absorbing element). Approximate dimensions of the test samples are as follows: primary energy absorbing element 19 has a height of 6 inches and a 10 inch diameter; thickness of each end plate 20a, 20b at its perimeter is ¼ inch and at the center is 1.0 inch; flexible reinforced restraining shell 39 thickness is ¼ inch; and the thin "sacrificial" layer of elastomer 40 covering each end plate is ¼ inch. In particular, one test sample was comprised of a substantially incompressible dampening inner section 15 formed of natural rubber with no curatives, which had a weight equal to approximately one-half the total weight of the primary energy absorbing element 19, and a 0.055 inch diameter cord helix tensile load carrying section 35 made of du Pont's Kevlar, which was spaced at 90% pack and which had a denier of 2250.

Figure 5:
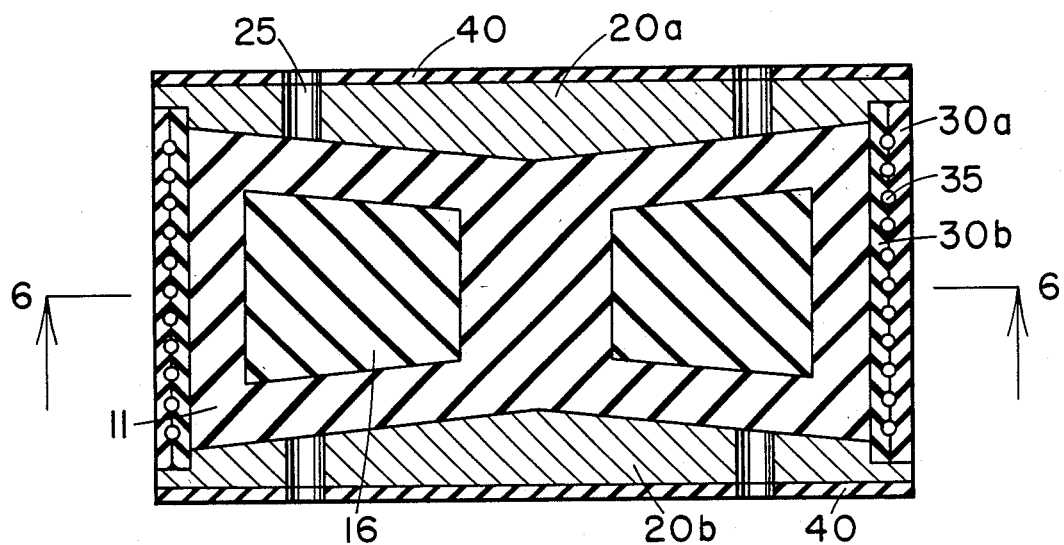
FIG. 5 is a sectional view similar to FIG. 2 illustrating an alternative embodiment of the invention.
Figure 6:
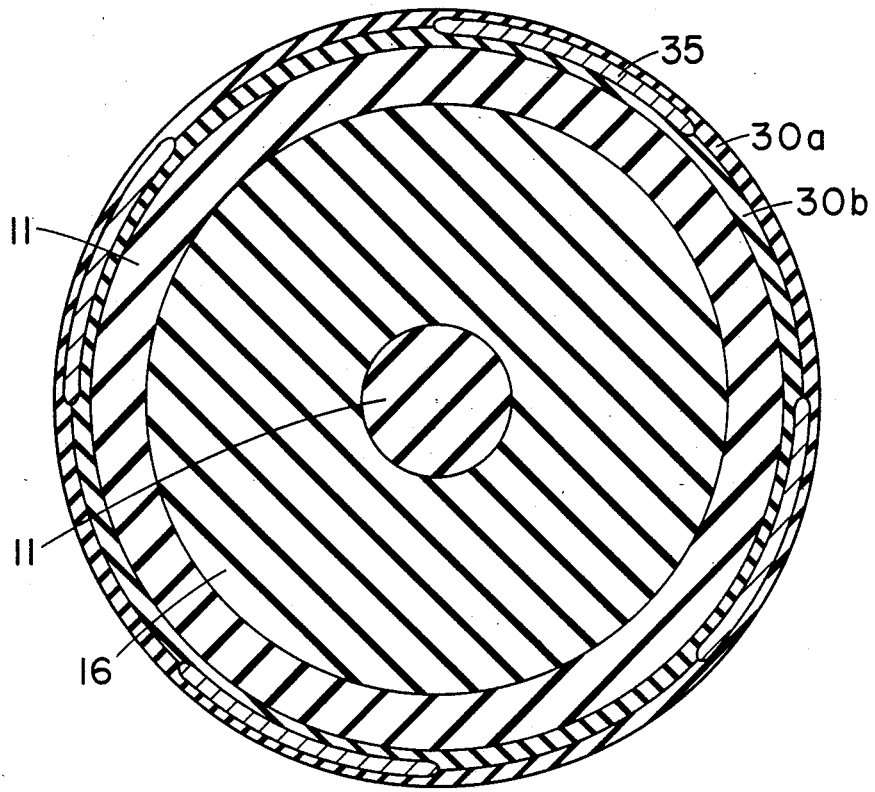
FIG. 6 is a top sectional view taken along 6—6 of FIG. 5 showing a donut-shaped section of substantially incompressible dampening material.

Although the above discloses the preferred embodiment of the instant invention, the following examples describe alternative constructions of the base isolation pad which do not depart from the scope of the instant invention. FIG. 5 and FIG. 6 illustrate an alternative construction of the primary energy absorbing element comprising a donut-shaped section 16 made of a substantially incompressible material which is an effective dampener and a second section 11 made of a minimally dampening resilient elastomer which is compatible with the material chosen for donut-shaped section 16. Said second section 11 both surrounds and is in the center of donut-shaped section 16.

Figure 7:
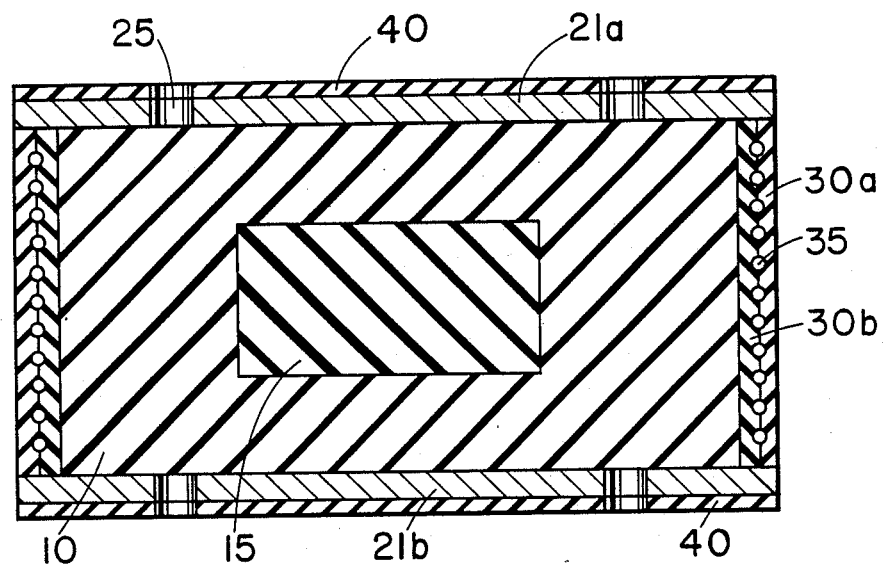
FIG. 7 and FIG. 8 are both sectional views similar to FIG. 2 illustrating two other alternative embodiments of the invention.
Figure 8:
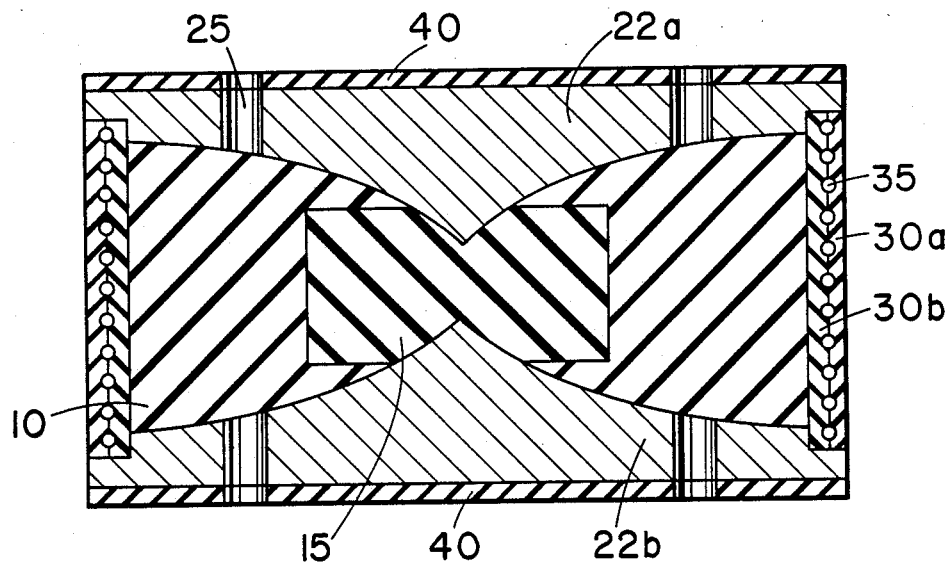
Figure 9:
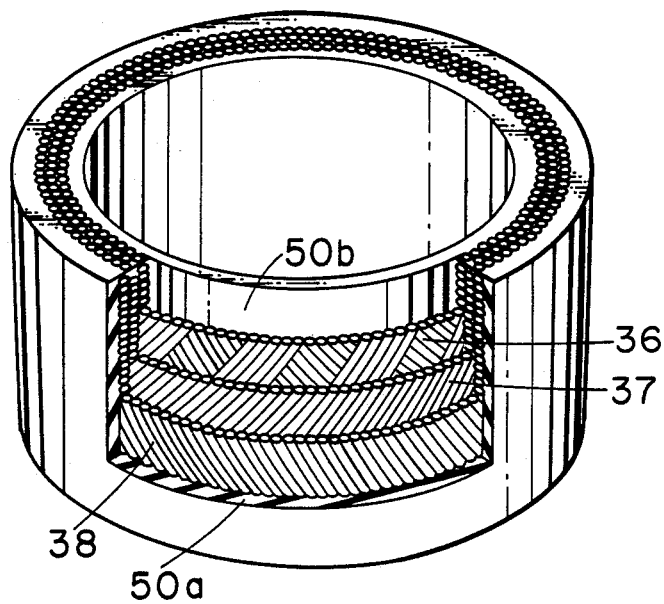
FIG. 9 and FIG. 10 are partially cut away views in perspective illustrating alternative embodiments of the flexible reinforced restraining shell.
Figure 10:
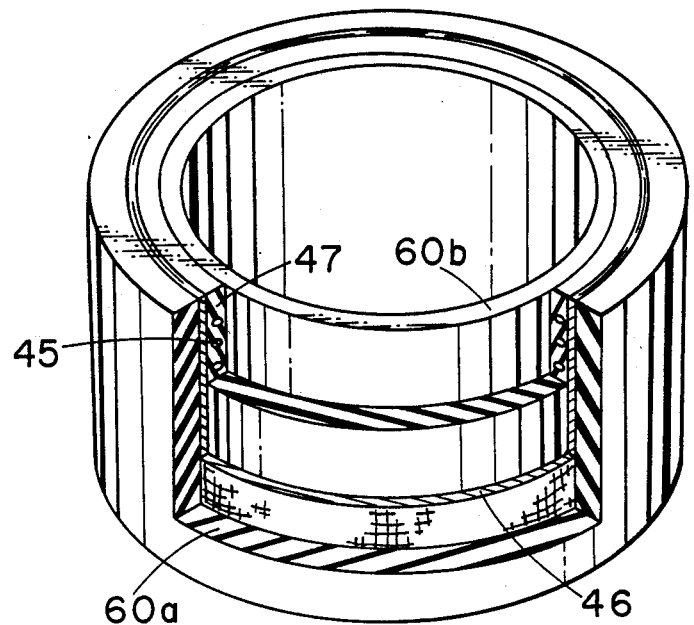

FIG. 7 shows a base isolation pad which is very similar to the preferred embodiment of FIG. 1. A difference can be seen in the two end plates 21a, 21b which have two substantially flat surfaces and have uniform thickness. FIG. 8 shows a base isolation pad which is also very similar to the preferred embodiment of FIG. 1. However, the two end plates 22a, 22b have a thickness near the center of each plate which is substantially larger than the end plates 20a, 20b shown in FIG. 1. When the device shown in FIG. 8 deflects in the horizontal or transverse direction, the relative movement of the two end plates 22a, 22b forces the material of the inner section 15 through the gap existing between the central portion of the two end plates. The movement of the inner section 15 material through this gap affects both device stiffness and dampening in the horizontal and vertical directions.

We claim:

1. A device for absorbing energy adapted to be positioned between two members which may vibrate or oscillate relative to one another due to forces applied to either one or both of the two members, which comprises:
   a first end piece engageable to one of the two members;
   a second end piece engageable to the other one of the two members;
   an energy absorbing means interposed between the first and second end pieces, said energy absorbing means having a substantially viscous inner section encapsulated by a resilient elastomeric section;
   means for securing said energy absorbing means to each of the first and second end pieces; and
   a flexible reinforced tubular restraining shell surrounding said energy absorbing means and extending at least partially between the first and second end pieces, said restraining shell comprising a helical tensile load carrying member extending substantially the full height of said restraining shell, said restraining shell in conjunction with said energy absorbing means capable of functioning as a support.

2. The device of claim 1 wherein said reinforced tubular restraining shell further comprises two flexible resilient sections that sandwich said helical tensile load carrying member therebetween, said flexible resilient sections to extend the full height of said shell.

3. The device of claim 2 wherein said flexible resilient sections of said reinforced tubular restraining shell are made of a similar resilient elastomer which has resistance to harsh environmental conditions and said resilient elastomeric section is comprised of rubber.

4. The device of claim 2 wherein said flexible resilient sections of said reinforced restraining shell are made of two dissimilar resilient elastomers, and wherein the exposed outer flexible resilient section is made from a resilient elastomer which has resistance to harsh environmental conditions.

5. The device of claim 2 wherein said substantially viscous section is donut-shaped and said resilient elastomeric section at least partially surrounds said donut-shaped substantially viscous section.

6. The device of claim 2 wherein said substantially viscous section is donut-shaped and said resilient elastomeric section comprised of rubber at least partially surrounds said donut-shaped substantially viscous section.

7. The device of claim 1 wherein said means for securing is a chemical bond and wherein the first and second end pieces are first and second plate members each having a top and bottom surface, the top and bottom surfaces of each of the plate members being substantially flat, and the thickness of each of the plate members being substantially uniform.

8. The device of claim 1 wherein said means for securing is a chemical bond and wherein the first and second end pieces are first and second plate members each having a surface not secured to said energy absorbing means, the surface not secured to said energy absorbing means of each of the plate members being substantially flat, and the thickness of each of the plate members being greater in the center than the thickness of the plate member's outer perimeter.

9. The device of claim 1 further comprising:
a first layer of noncorrosive elastomeric material which has resistance to harsh environmental conditions, at least partially covering a surface of the first end piece that is not secured to said energy absorbing means;
a second layer of noncorrosive elastomeric material which has resistance to harsh environmental conditions, at least partially covering a surface of the second end piece that is not secured to said energy absorbing means; and
means for securing said first and second layer of noncorrosive elastomeric material to the surfaces of the first end piece and the second end piece.

10. The device of claim 5 wherein said means for securing is a chemical bond and wherein the first and second end pieces are first and second plate members each having a top and bottom surface, the top and bottom surfaces of each of the plate member being substantially flat, and the thickness of each of the plate members being substantially uniform.

11. The device of claim 7 wherein said means for securing is a chemical bond and wherein the first and second end pieces are first and second plate members each having a surface not secured to said energy absorbing means, the surface not secured to said energy absorbing means of each of the plate members being substantially flat, and the thickness of each of the plate member being greater in the center than the thickness of the plate member's outer perimeter.

12. The device of claim 3 further comprising:
a first layer of noncorrosive elastomeric material which has resistance to harsh environmental conditions, at least partially covering a surface of the first end piece that is not secured to said energy absorbing means;
a second layer of noncorrosive elastomeric material which has resistance to harsh environmental conditions, at least partially covering a surface of the second end piece that is not secured to said energy absorbing means; and
means for securing said first and second layer of noncorrosive elastomeric material to the surfaces of the first end piece and the second end piece.

13. A device for absorbing energy to be positioned between two members which may vibrate or oscillate relative to one another due to forces applied to either one or both of the two members, which comprises:
a first end plate member and a second end plate member, each end plate member engageable to one of the two members, the thickness of each of said end plate members being greater in the center than the thickness of said end plate member's outer perimeter;
an energy absorbing means interposed between said first and second end plate members, said energy absorbing means having an inner section comprised of a substantially incompressible viscous fluid encapsulated by a resilient elastomeric outer section comprised of rubber;
means for securing said energy absorbing means to each of said first and second end plate members; and
a flexible reinforced tubular restraining shell surrounding said energy absorbing means and extending at least partially between said first and second end plate members, said restraining shell comprising at least one helical tensile load carrying section of high modulus material sandwiched between two flexible resilient sections made of a similar resilient elastomer, said reinforced tubular restraining shell and said first and second end plate members defining a container for restraining said resilient elastomeric energy absorbing means yet at the same time allowing said energy absorbing means to vibrate and deform when force is applied thereto, and in addition said restraining shell in conjunction with said energy absorbing means capable of functioning as a support.

14. An energy absorbing device adapted to be positioned between two members which may vibrate or oscillate relative to one another, which comprises:
a first end plate member and a second end plate member, each end plate member engageable to one of the two members;
an energy absorbing means interposed between said first and second end plate members, said energy absorbing means having an inner section comprised of rubber without curatives encapsulated by a resilient outer section comprised of rubber;
means for securing said energy absorbing means to each of said first and second end plate members;
a flexible reinforced tubular restraining shell surrounding said energy absorbing means and extending at least partially between said first and second end plate members, said restraining shell comprising at least one tensile load carrying reinforcement section at least partially imbedded within a flexible resilient elastomeric section, said resilient elastomeric section extending the full height of said shell, said shell in conjunction with said energy absorbing means capable of functioning as a support;
a first layer of noncorrosive elastomeric material which has resistance to harsh environmental conditions, at least partially covering a surface of said first end plate member that is not secured to said energy absorbing means; and
a second layer of noncorrosive elastomeric material which has resistance to harsh environmental conditions, at least partially covering a surface of said second end plate member that is not secured to said energy absorbing means.

15. In a resilient support device to be positioned between two members which may vibrate or oscillate relative to one another which comprises: a top and bottom end piece each engageable to one of the two members; an elastic core having at least one curved outer surface, the core interposed between the first and second end pieces; and a reinforced resilient elastomeric casing surrounding the curved outer surface, the improvement comprising:
the elastic core comprising a substantially viscous inner section encapsulated by a resilient elastomeric section; and the reinforced resilient elastomeric casing is adapted for permitting the device to support a load yet allow the device to undergo limited deformation upon application of a force, the casing and the elastic core having no bond therebetween, and the casing to comprise:

a resilient elastomeric section extending the full height of the casing; and a helical tensile load carrying member imbedded within said resilient elastomeric section, said helical tensile load carrying member wound at an angle that is 54° up to 90° from a direction parallel to the axis of said helical tensile load carrying member.

* * * * *

UNITED STATES PATENT AND TRADEMARK OFFICE
CERTIFICATE OF CORRECTION

PATENT NO. : 4,887,788
DATED : Dec. 19, 1989
INVENTOR(S) : Richard J. Fischer; Douglas J. Swanson It is certified that error appears in the above-identified patent and that said Letters Patent is hereby corrected as shown below:

Title page, paragraph [75] "Inventors:" should read --Richard J. Fischer, Golden; Douglas J. Swanson, Castle Rock; and Jonathon A. Johnston, Northglenn, all of Colorado--.

Signed and Sealed this

Twenty-ninth Day of January, 1991

Attest:

HARRY F. MANBECK, JR.

*Attesting Officer*    *Commissioner of Patents and Trademarks*